Figure 1:
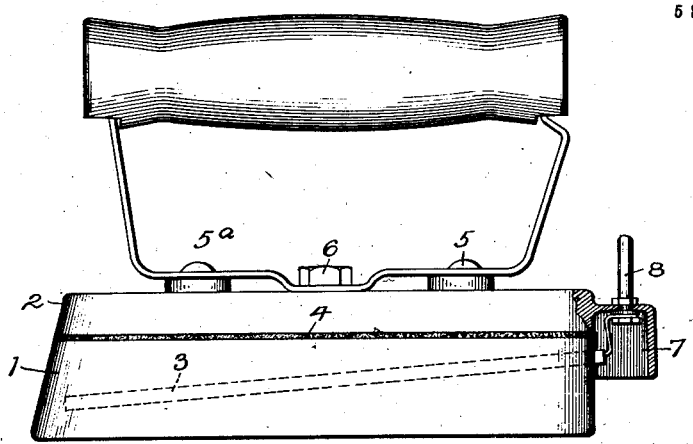

W. STANLEY.
ELECTRIC HEATING DEVICE.
APPLICATION FILED MAY 13, 1909.

1,046,887.

Patented Dec. 10, 1912.
5 SHEETS—SHEET 1.

WITNESSES:
W. Ray Taylor.
J. Ellis Glen

INVENTOR:
WILLIAM STANLEY
BY
ATTY.

W. STANLEY.
ELECTRIC HEATING DEVICE.
APPLICATION FILED MAY 13, 1909.
1,046,887.
Patented Dec. 10, 1912.
5 SHEETS—SHEET 2.
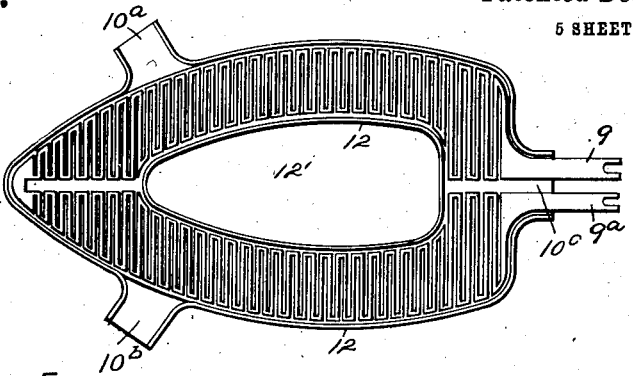
Fig. 4.
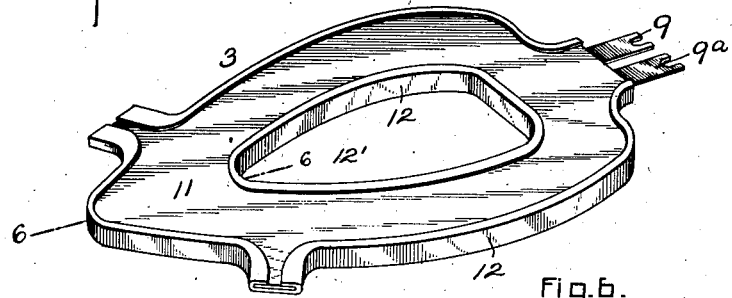
Fig. 5.
Fig. 6.
Fig. 7.
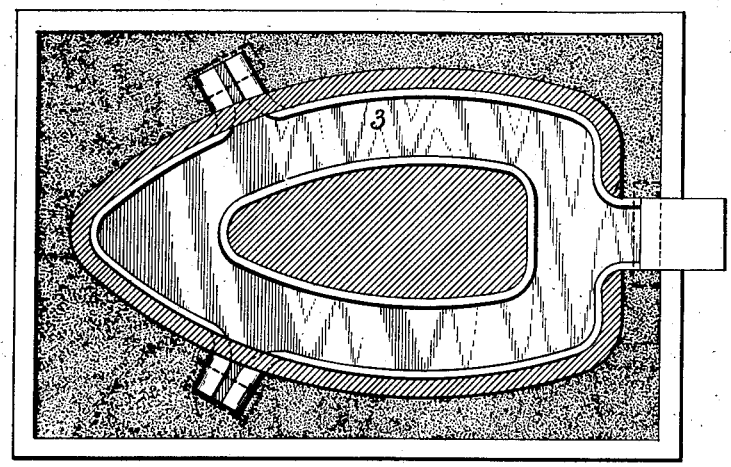
WITNESSES:
M. Ray Taylor
J. Ellis Glen
INVENTOR:
WILLIAM STANLEY
BY Albert G. Davis
ATTY.

W. STANLEY.
ELECTRIC HEATING DEVICE.
APPLICATION FILED MAY 13, 1909.
1,046,887.
Patented Dec. 10, 1912.
5 SHEETS—SHEET 3.
Fig. 8.
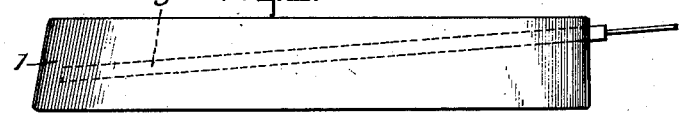
Fig. 9.
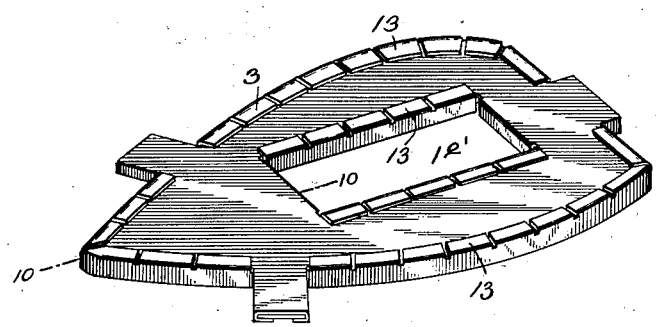
Fig. 10.
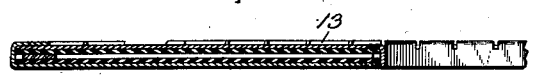
Fig. 11.
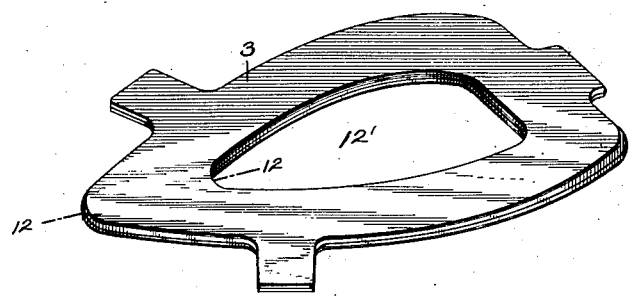
Fig. 12.
WITNESSES:
M. Ray Taylor
J. Ellis Glen
INVENTOR:
WILLIAM STANLEY
BY Albert G. Davis
ATTY

W. STANLEY.
ELECTRIC HEATING DEVICE.
APPLICATION FILED MAY 13, 1909.

1,046,887.

Patented Dec. 10, 1912.
5 SHEETS—SHEET 4.

WITNESSES:
W. Ray Taylor.
J. Ellis Glen

INVENTOR:
WILLIAM STANLEY
BY
ATTY.

W. STANLEY.
ELECTRIC HEATING DEVICE.
APPLICATION FILED MAY 13, 1909.

1,046,887.

Patented Dec. 10, 1912.
5 SHEETS—SHEET 5.

WITNESSES:
INVENTOR
WILLIAM STANLEY.
BY
ATT'Y.

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ELECTRIC HEATING DEVICE.

1,046,887.  Specification of Letters Patent.  Patented Dec. 10, 1912.

Application filed May 13, 1909. Serial No. 495,753.

*To all whom it may concern:*

Be it known that I, WILLIAM STANLEY, a citizen of the United States, residing at Great Barrington, county of Berkshire, State of Massachusetts, have invented certain new and useful Improvements in Electric Heating Devices, of which the following is a specification.

My present invention relates to electric heaters, the general objects being to improve the thermal relation between the heating element and the work, and to increase the hardiness and durability of the apparatus. Heretofore the general practice has been in making electric heaters to fasten the heating element, usually a resistance wire wound or reflexed, on the outside of the heating device by clamping upon an intervening layer of insulation, or causing it to adhere to a layer of enamel. I proceed in a radically different manner by inclosing the heating element in a close fitting refractory casing of steel, or other suitable heat conductor; thin insulation of mica or other non-conductor being interposed between the walls of the casing and the heating element. The armored heating element thus produced is placed in a mold properly prepared by a pattern, and molten aluminium, iron, or other metal is poured into the mold to produce a casting of the proper shape of the utensil desired with the heating element embedded within the body of the casting properly insulated. The heating device thus produced may be a stove, pan, pot, flat iron, or any electrically heated appliance desired. The product is one in which the heating element is clad in a durable protective armor insuring the device against damage by abuse, and what is more important still, insuring an intimacy of contact between the heating element and the heat distributing body, which can be secured in no other way. The shrinkage of the cast envelop produces an enormous pressure and compacts the mica or other insulation, holding it stably under molecular pressure, and thereby increasing its thermal conductivity: the shrinkage further effects a maximum thermal conductivity between the heating element and the double metal armor which incloses it. In this way not only is all the heat generated by the watt energy consumed in the heating element rendered available for work in the domestic or other operation carried on and the maximum economy thereby insured, but the thermal drop between the source, and the work is greatly reduced, and the temperature of a part of the device where heat is to be applied to useful work is raised quickly. I prefer to employ for the heating element a wire or ribbon made of a refractory metal, which will stand hard service without deterioration or disintegration for an indefinite period. A wire of this kind is the chrome-nickel alloy covered by the patent of Dempster, No. 901,428, dated October 20, 1908. Other kinds of such wire might, however, be employed, the prime consideration being ability to successfully stand service temperatures of the heating element for a long period. I prefer the chrome-nickel alloy, however, as it has a very high melting point and a very high specific resistance and, therefore, might be run safely at even a red heat. By reason, moreover, of its high specific resistance the wire may be made of larger cross section and stronger than is possible with materials of a lower specific resistance; but with any kind of selected wire the durability of the cast-in unit of my invention is limited only by the durability of the device itself. The heating element being sealed in its metallic armor, is practically as safe as if inclosed in a vacuum, and is, therefore, guarded against the deteriorating influence of the atmosphere, or other causes which might tend to change its stability.

Having thus outlined in a general way the nature of my invention, I will now more particularly set forth the best manner I have thus far developed for carrying it into effect.

A ribbon of resistance wire is wound on a thin sheet mica support, or a punched grid or reflexed ribbon without any support is laid between two thin sheets of mica a few mills in thickness, and placed in a sheet-iron or mild-steel casing. A thin sheet of iron or steel is then laid on top of the upper sheet of mica, and the under sheet is closed over by folding, crimping, peening, pressing, welding or brazing, or by any improved method of making a compact closure which will keep the heating element firmly bound within it. Fins or spurs at several symmetrical points, integral with the casing, are allowed to project, and these form prints or points of support for the incased unit in the mold. A sand mold is made from a pattern of the desired utensil, and the incased heating unit above described is laid in the bottom or other appropriate part; the lead wires for the resistance element being carried out of the same through the prints. Molten metal is then poured into the mold. This may be aluminum, brass, copper, iron, or any metal desired, having a lower melting point than the casing around the heating element. The device, when removed from the mold, has the heating element hermetically inclosed in a substantial metal armor, and the latter may be tooled or finished where necessary by ordinary methods, and the heating element leads connected with terminals in a block of insulation to complete the device for the market. In the case of a saucepan, frying pan, kettle, or the like, in which the work is above the heater, I make the casting with the incased heating element in the bottom; the latter covering the desired and almost entire area of the bottom of the utensil. To effect this a size of ribbon is selected to produce the required drop of potential when the desired area is covered, or in case a punched grid is employed, the punching die is shaped to form parts of the grid of proper sectional area. In the case of a flat iron, where some part, as the toe of the iron, might preferably have a higher heat, I mount the incased heating element in an inclined position in the mold, whereby a smaller mass of metal intervenes between the toe of the iron and the heating element, so that a higher temperature will be maintained at this point, because the path of thermal resistance is shorter, and besides, the temperature of this part will be more easily maintained when damp goods, or similar exacting work rapidly extracts the heat of the iron. By my mode of procedure not only does the molecular shrinkage of the casting contribute by its great pressure in establishing good heat joints between the resistance element and the insulation, but by a proper selection of the materials of the element casing and the casting metal the surface portion of the casing will fuse slightly so as to unite the casing with the casting metal. Further than this an important result follows the use of the metal casing between the cast armor and the insulated resistance element, the latter being free to move or slip somewhat when the casting operation takes place, it is not broken by shrinkage of the casting nor can the insulator be cracked from this cause and produce a short-circuit. It will thus be seen that my invention comprises a suitable casing for a suitable heat element completely inclosing and insulating it, and a cast metal armor to distribute the heat; it comprises also the new process of manufacture described. The several specific features of the envelop will be set forth more at length hereinafter, and will be particularly pointed out in the claims.

Figure 2:
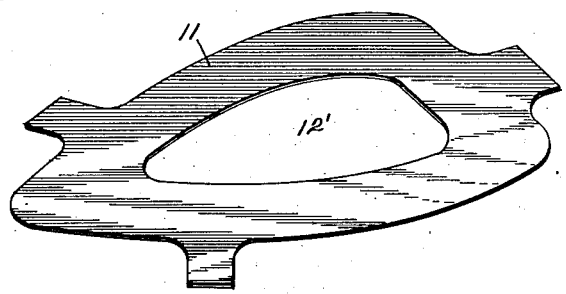
Figure 3:
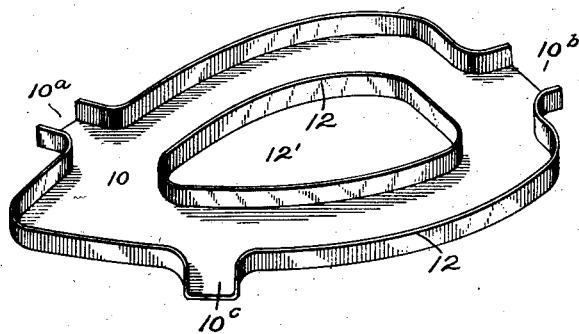
Figure 13:
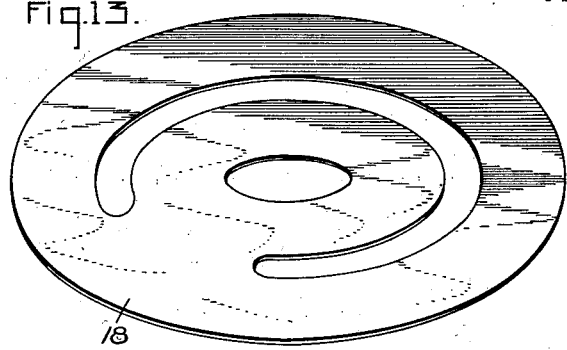
Figure 14:
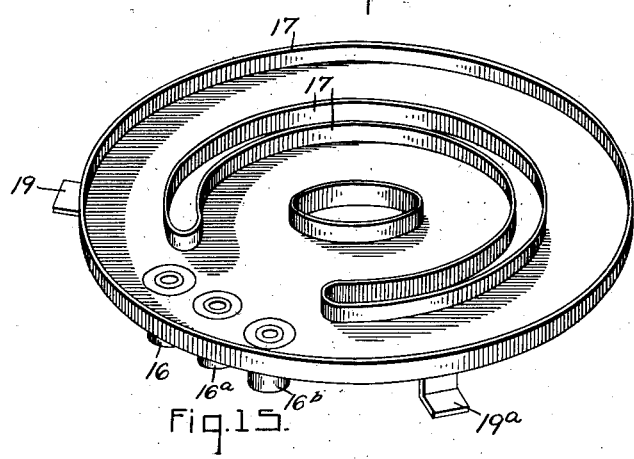
Figure 15:
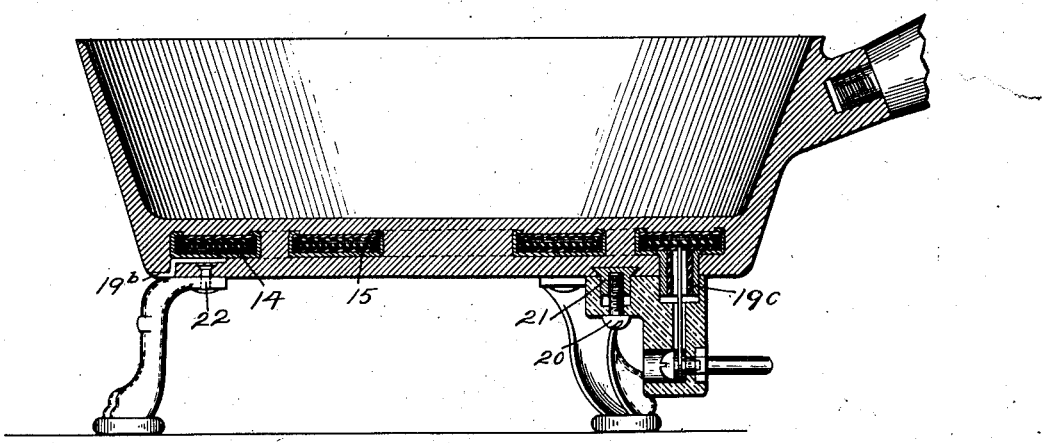
Figure 16:
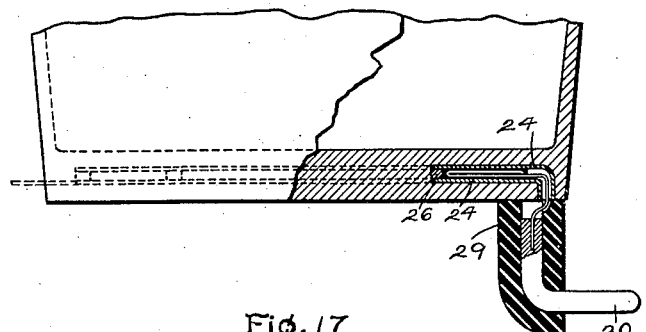
Figure 17:
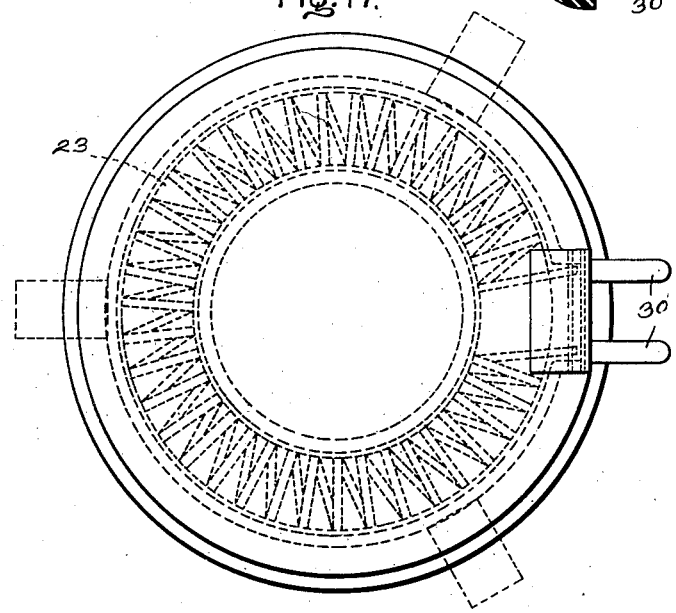
Figure 18:
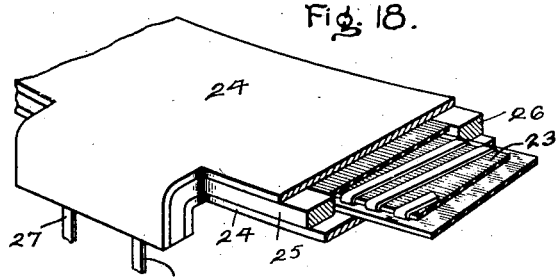

Referring now to the drawings, Figure 1 shows a side elevation, partly in section, of a flat iron embodying my invention, the inclined heating element being shown in dotted lines; Figs. 2 and 3, isometric projections of the two parts of the metal casing in which the heating element for the flat iron is inclosed; Fig. 4 is a plan view of a punched iron grid shown in the bottom portion of its casing; Fig. 5 is an isometric projection of the completely incased heating element for a flat iron ready for application to the mold; Fig. 6 is a sectional view across the toe of the heating element, the parts being very much exaggerated in size to show them more clearly; Fig. 7 is a plan view, showing the flat iron in its mold, the upper part of the mold being removed, and the body of the casting shown in section; Fig. 8 is a side elevation of the metal casting of the sole, or lower part of the flat iron containing the heating element cast in, the latter being shown in dotted lines; Fig. 9 is an isometric projection of an incased heating element, showing another method of crimping the parts of the casing together; Fig. 10 is a sectional view of Fig. 9, showing arrangement of the heating element in its casing, the parts being very much exaggerated in size to show them more clearly; Fig. 11 is an isometric projection of a casing for the heating element, the parts of which are welded or brazed together; Fig. 12 is a sectional view of Fig. 11, the parts being very much exaggerated in size to show them more clearly; Figs. 13 and 14 are isometric projections of parts of a round casing for the heating element; Fig. 15 shows a completed saucepan with the heating element cast in; Figs. 16 and 17 show another form of heating element, in which the resistance ribbon is wound on a mica ring and inclosed between mica rings incased in metal, and Fig. 18 is an enlarged detail of the design of Figs. 16 and 17.

It will be understood from these drawings that the specific embodiments shown, namely, a flat iron, saucepan and pot, are merely samples of applications of the invention, and that it may be applied in any type of electric heater.

Referring now to the flat iron shown in Figs. 1 to 12 of the drawings, 1 represents the sole piece of the iron and 2 the cap, the former containing the cast-in incased heating element 3; the two parts being separated by heat insulation, as asbestos, indicated at 4, and fastened together and to the handle by means of screws 5, 5ᵃ, 6. The upper casting may be provided with a hood 7, under which the terminal connections of the heating element are made with metallic pins 8 adapted to form a connection with a flexible cord or plug leading to a suitable source of electric supply in the manner usual in the art. The heating element 3 consists of a resistance grid or ribbon. A punched grid, which I sometimes employ, is seen in Fig. 4, where a sheet of high resistance metal of the alloy hereinbefore mentioned, or other resistance medium is punched, cut or sheared, so as to provide a tortuous path for the current and of an outline of the flat iron, the central part being open to permit the heat to be evolved principally along the working surfaces of the iron and to effect uniform distribution as the heat does not so readily diffuse from the inner parts. Integral with the grid are terminals 9, 9ª forked to span a screw. This heating element is laid in a pressed cup, as Fig. 3 or 4, of sheet iron or mild steel, the cup being provided with openings at 10ª, 10ᵇ, 10ᶜ, which serve as prints to support the element in the mold and to permit the terminals to be carried out, as will be evident from Figs. 4 and 5. A thin sheet of mica is laid in the bottom of the cup 10; the resistance element is laid above it; another sheet of mica is placed on top of the resistance element, and a thin sheet of iron (as shown in Fig. 2, at 11), conforming in shape to the cup, is laid above the upper sheet of mica. The vertical ridge 12 (Fig. 3) of the cup is then closed over in a press, producing a wide flange, as indicated in Fig. 5, which gives a practically airtight seal to the insulated resistance element in the iron casing. The terminals project as indicated in Fig. 5. The incased resistance element thus produced is laid in a sand mold, which has been previously prepared with a pattern conforming to the sole of the flat iron 1. Metal is then poured in the mold and completely incases the iron-clad resistance element, the mass of iron connecting the upper and lower portions through the hollow central space 12', the terminals being protected by a chaplet, as indicated in Fig. 7, and the prints being supported as indicated in dotted lines. When the casting is removed from the mold the heating element 3 is incased therein, as indicated in Figs. 1 and 8, and the projecting prints are dressed off. I prefer to support the heating element in an inclined position in the mold, so that the part adjacent to the toe of the iron is closer to the sole than the main body thereof. In this way greater heat is evolved at the toe, which is desirable in flat irons.

In Figs. 9 and 10 a modified form of casing is shown, in which the vertical rib of the casing is notched and the wings 13 are peened or folded over on the top plate.

The dimensions are very much exaggerated in all of these figures, as the completed heating element is formed of sheet iron about 34 mills in thickness, the resistance element itself being only a few mills in thickness, and the mica also a few mills in thickness.

In Figs. 11 and 12, is shown a form in which the parts of the casing are simply punched sheets of metal laid on the top and bottom of the insulated resistance element, and the outer edge brazed or welded together to produce an airtight joint. The element thus completed is absolutely airtight, and does not permit the least air to escape into the molten metal and cause a defective casting. The sheathing being formed of wrought iron, has a higher melting point than the cast iron, and may be successfully inclosed in the casting which will slightly fuse the same without injuriously affecting it. In cooling the large mass of cast iron shrinks, producing an enormous molecular pressure upon every part of the resistance element, compacting the mica into a minimum space and forcing with tremendous pressure all of the parts into the best possible relation for good thermal conductivity. From this it results that the heat disengaged by the heating element flows with maximum freedom across the mica insulation to the working face of the iron, and there is a minimum lag in heat transmission between the heating element and the work.

In the design shown in Figs. 13, and 14 and 15 the heating units are applied to an open vessel, such as a saucepan. For culinary utensils for boiling or heating liquids the inclosing casting may with advantage be made of a metal of lower melting point. I have found aluminum very satisfactory both from a manufacturing and commercial standpoint. The method of manufacture is essentially the same as that hereinbefore described, except that in this case a larger heat area is to be covered, and I prefer to employ a double heating element by forming two iron-clad resistance elements concentrically arranged, as indicated at 14, 15 in Fig. 15, the terminals being brought out through three iron cups 16, 16ª, 16ᵇ of Fig. 14, these cups being attached to the bottom section of the casing. In this case a double annular rib 17 is formed in the lower section of the casing, and after the parts of the unit are assembled the plate 18 is laid on top of the casing and the vertical ridge closed over in a press, so as to seal and inclose the insulated heating element. Prints 19, 19ª, etc., symmetrically arranged, are riveted to the casing for proper assembly in the mold, as hereinbefore described, the only difference being that the pattern is varied to form a sauce pan, or other open vessel in a manner well understood by those familiar with casting metals. The terminals are carried out through the openings 16, 16ª, 16ᵇ suitably lined with insulation, as indicated at 19ᶜ in Fig. 15, and a plug of refractory insulating compound is secured by lag screws 20 engaging a threaded iron socket made a part of the casting, as indicated at 21. If desired, rivets, as 22, may be formed in the casting, by which feet may be attached to the pan.

In Figs. 16, 17 and 18 the unit is formed by winding a thin ribbon of high resistance metal on a ring 23 of mica, similar mica rings being placed on the top and bottom, and sheet iron or steel rings 24 (Fig. 18) superposed at top and bottom. The joints may be formed by placing iron rings 25, 26 on the inside and outside of the heating element and brazing or welding along the inner and outer peripheral edge. Terminals may be brought out, as indicated at 27, 28, and the incased unit cast in a manner similar to that hereinbefore described. A plug of refractory insulating compound 29, having a terminal 30 affixed thereto, may be connected with the terminal to fit the device for service.

Although I have shown the invention herein as applied to cooking utensils and flat irons, it will be understood that my invention is in no respect limited thereto, but may be applied to any electric heating device, or other type of apparatus where heat is to be distributed or dissipated, and the position of the incased heating unit may be varied as service conditions require.

What I claim as new and desire to secure by Letters Patent of the United States, is:—

1. An electric heater comprising a resistance conductor formed to cover an area conforming to the shape of the body to be heated, a similarly formed metallic casing inclosing said conductor, and a body of metal cast around the casing.

2. An electric heater, comprising a resistance element having an insulating medium and an inclosing metal shell around it, and a casting of metal having a lower melting point than the shell inclosing all.

3. An electric heater having a cast-in insulated heating element tilted in the casting to vary the heat distribution.

4. An electric heater, comprising a resistance element insulated in an inclosing metallic casing, a casting around the whole enveloping it without joints, terminal connections with the element, and cast-in lugs for attaching accessory parts.

5. An electric heater, comprising a resistance element inclosed in and insulated from a two-part metal casing with airtight joints, and a casting inclosing the whole in a solid armor.

6. An electric heater, comprising a resistance element, insulation around the same, a casing around the insulation, and a casting enveloping the casing, said casting threading the element at an interior point to promote heat distribution.

7. An electric heater, comprising a resistance element having an interior opening, a metallic casing about the same having a corresponding opening, and a casting inclosing both in a metallic envelop covering the inside and outside of the opening.

8. A flat iron having a sole casting containing an inclosed insulated resistance element cast within the same, a heat insulated cover on the sole, and a handle attached to the flat iron.

9. The process of making an electric heater, or the like, consisting in insulating and inclosing the resistance element in a metal shell, supporting the shell in a hollow mold with the element terminals protected, and then casting around it a metal having a melting point such that it will slightly fuse the surface of the shell.

In witness whereof, I have hereunto set my hand this 6th day of May, 1909.

WILLIAM STANLEY.

Witnesses:
ENSIGN WORTHY,
P. A. SMITH.